Aug. 11, 1936.    R. E. CHOATE ET AL    2,050,274
ENDLESS TRACK STRUCTURE
Filed June 30, 1934
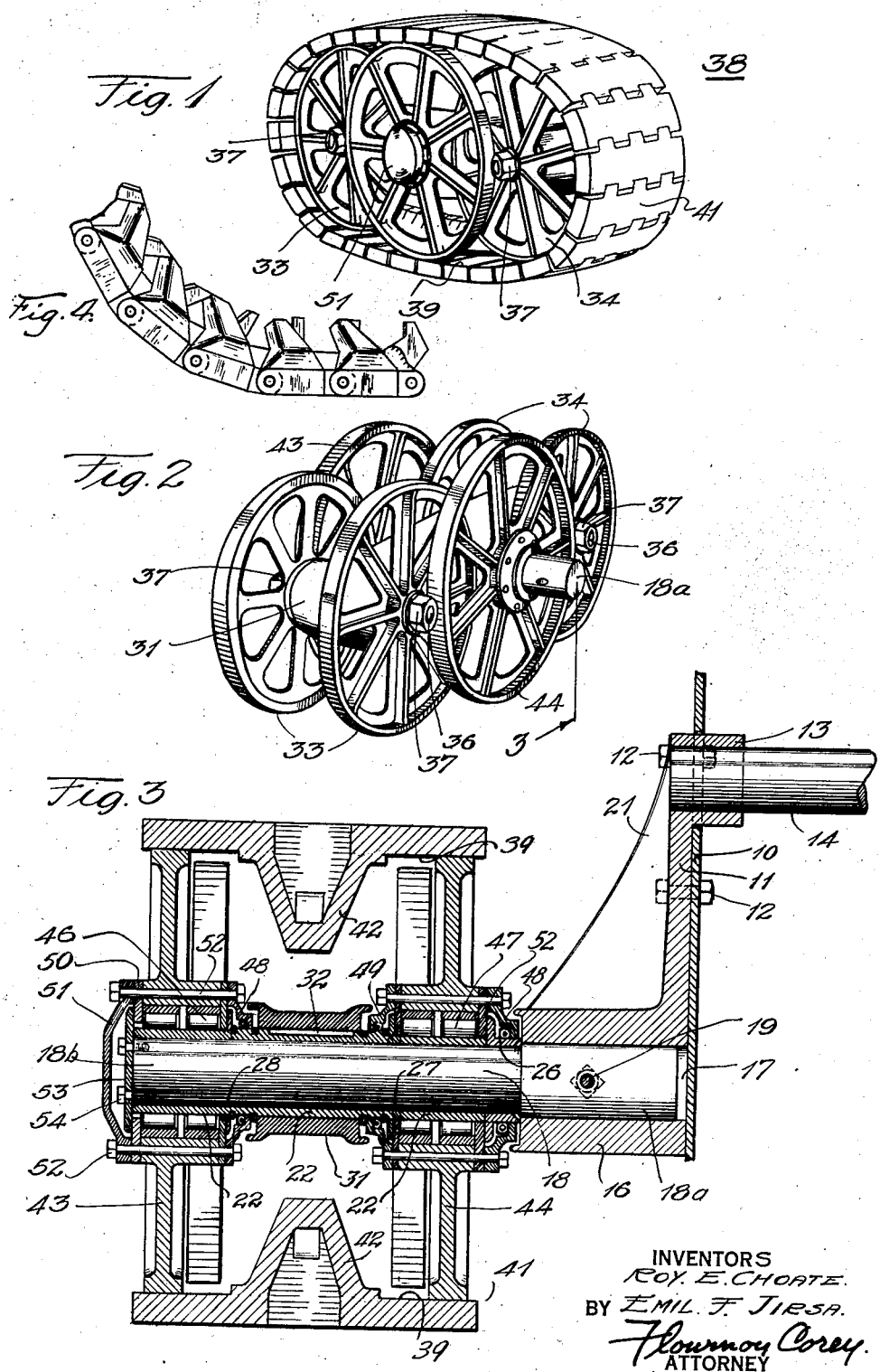
INVENTORS
ROY. E. CHOATE.
BY EMIL. F. JIRSA.
Flournoy Corey
ATTORNEY Patented Aug. 11, 1936

2,050,274

UNITED STATES PATENT OFFICE 2,050,274

ENDLESS TRACK STRUCTURE

Roy E. Choate and Emil F. Jirsa, Cedar Rapids, Iowa, assignors to La Plant-Choate Manufacturing Company, Incorporated, Cedar Rapids, Iowa, a corporation of Delaware Application June 30, 1934, Serial No. 733,244

2 Claims. (Cl. 305—9)

Our invention relates to endless track structures and has particular relation to wheel constructions and arrangements for such structures.

It is common practice in carrying heavy loads to employ two or more endless track structures which present broad supporting surfaces to the ground to thereby distribute the load over large ground areas and prevent the carrying device from sinking into the ground. These structures commonly employ at least two pairs of spaced supporting wheels on which the endless tracks run and by which the tracks are supported. The pairs of wheels are commonly rotatably engaged on rocking beams or the like which are in turn pivotally engaged to the wagon tractor or other load carrying structure. The rocking beams are pivotally engaged to the load carrying structure so that the track and wheels may turn or pivot about a transverse horizontal axis to permit the track to accommodate itself to inequalities of the ground. It is also common practice, in such types of endless track structures, to employ interlocking treads so constructed that the adjacent treads cooperate to form an inverted arch at that portion of the tread which is in contact with the ground in order that the track be self supporting between the pairs of supporting wheels.

In some endless track structures the treads are not constructed in such a manner that they form an arch between the pairs of supporting wheels, and it is then necessary to employ one or more idler wheels which are rotatably engaged on the upper faces of the ground engaging portions of the endless belts. These idler wheels usually were in the same planes as the supporting wheels and engaged only the ground engaging side of the link belt or endless tread.

The devices of the prior art could therefore be divided into two groups, one group consisting of the self-supporting track structures and the other of a nonself-supporting track structure which employed idler wheels for maintaining the ground engaging portion of the belt in contact with the ground.

There were several disadvantages of the devices of the prior art. The parts of the arched type in time became so worn that the arch flattened out to such a degree that the track could not be used and it had to be repaired either by substituting new links or by building up the worn portions of the old links. The nonself-supporting devices also became worn and the idler wheels developed another source of trouble and friction. Both devices have a tendency to "nose down" and dig into the ground as they are being drawn along over the surface of the ground, and both types are likely to become filled with dirt or the like until their operation is seriously affected. With the arched type of track, in order to carry extremely heavy loads, it was necessary to make the treads of very thick heavy sections so as to support the load over the large ground contact area and meet the tremendous stresses which obtain because of the relatively flat arch of the track.

We have observed these difficulties of the devices of the prior art and after considerable investigation have devised a new and novel track and track supporting structure which avoids the difficulties above enumerated and which is extremely efficient and reliable.

A general object of our invention is to provide a new and novel endless track and track supporting structure.

A more specific object of our invention is to provide means for causing the forward portion of an endless track to tend to rise as the device is being pulled along the ground.

Another object of our invention is to provide means for obtaining large ground contact areas without materially increasing the weight and size of the track shoes.

Another object of our invention is to provide means for keeping out dirt, rubbish and the like from the track.

A feature of our invention is that of providing idler wheels which are outside of the ordinary supporting wheels and which run on track surfaces which are separate from the usual supporting wheel rail surfaces.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims, without departing from the spirit of the invention.

In said drawing:

Figure 1 is a view in perspective of an endless tread track constructed according to one embodiment of our invention.

Figure 2 is a view in perspective of the track supporting wheels of the structure shown in Figure 1.

Figure 3 is a view in section of a stub axle and showing a rocking frame and center wheels mounted thereon according to our invention, and Figure 4 is a view in side elevation of a portion of the self-supporting track.

Referring now more particularly to Figure 3 of the drawing there is shown at 10, the side plates of a wagon box, to which a leg bracket 11 has been attached as by means of bolts 12. The upper end of the leg bracket 11 is provided with an inwardly extending boss 13 which is provided with a central opening to receive the cross shaft 14. The lower end of the leg 11 is provided with a large outwardly-extending boss 16 which has a central, transversely-extending opening 17, which is adapted to receive the large end 18a of a stub shaft 18. The stub shaft is held in place by means of a through bolt 19 which extends through the wall of the boss 16 and through the shaft. A web brace 21 is provided to afford added rigidity and strength for the leg bracket 11, to support the load imposed on the boss 16.

The main portion 18b of the stub shaft 18 is of reduced diameter and a long sleeve 22 is placed on this reduced portion of the shaft to act as a journal for the rotating parts of the center wheel assembly and a rocking beam hereinafter more particularly described. Various spacing members 26, 27, and 28 are pinned to the sleeve at spaced intervals by dowel pins.

The rocking beam 31 is engaged upon the sleeve 22 either by means of welding or by a key such as indicated at 32, in accordance with the usual custom. Pairs of supporting wheels 33 and 34 are rotatably mounted on the outer ends of the rocking beam 31 by means of through shafts 36 and nuts 37.

The supporting wheels 33 and 34 are those ordinarily used as supporting wheels for the endless track 38 and these wheels run on the inner faces 39 of the treads 41 of track 38 adjacent to the jaws 42 which are located at the inner central portion of each track shoe. The sides of the jaws and the wheels 33 and 34 cooperate to guide the track and the jaws 42 hold the track in arched condition between the supporting wheels and in stacked condition on the wheels, in accordance with the usual practice.

In devising tracks for supporting extremely heavy loads it was found that there was a definite limitation as to the distance between the pairs of supporting wheels. After considerable investigation and experimentation we devised center wheels 43 and 44 which are rotatably mounted on the long sleeve 22, by means of roller bearing structures 46 and 47. The sleeve 22 is secured to the rocking beam 31 as by means of welding or by a key such as the key 32 and the sleeve thus rotates with the beam and on the shaft 18. The wheels 43 and 44 rotate on the sleeve 22. The sleeve in turn rotates on the shaft 18 in response to movement of the beam 31. The bearing structure may be roller bearings or ball bearings or sleeve bearings as desired. Suitable circular flanges 48 and 49 and dust caps 51 and 53 are employed for closing the joints between the wheels and shaft 18. The flanges 48 and 49 and cap 51 are held in place by means of bolts 52 passing through the hub of the wheel 43. Cap 53 abuts against the end of the shaft 18 and against the space 50 on wheel 43, and this cap is held in place by means of stub bolts 54. The wheels 43 and 44 are located outside of the planes of wheels 33 and 34 and run on the outermost portions of the inner face 39 of treads 41. They preferably do not, at any time, contact the jaws 42.

The wheels 43 and 44 are of sufficient diameter that they roll on the inner face of the lower or ground engaging portion of the track and also on the inner face of the upper or returning portion of the track. The wheels 43 and 44 have no guiding action because they do not engage any vertically-extending flanges or jaws 42 on the treads. They have no driving action other than that afforded by friction. In fact, the inside and outside center wheels are independent of each other and one may "coast" along while the other is rotating. Of course the top portion of the track need not rest on the center wheels and if desired the axes of the center wheels might be lowered so that the wheels would engage only the lower portion of the track.

The center wheels also serve the purpose of breaking up the arch between the two pairs of supporting wheels 33 and 34 into two parts, and even if the connecting portions of the tread becomes badly worn the center wheels maintain the arched shape of the track and assist in a very peculiar manner to cause the entire assembly to "nose up" as the load carrying vehicle is drawn along over the surface of the ground.

In the following paragraphs the action which occurs when an endless tread belt becomes worn and the action which occurs as such a structure passes over an obstruction is discussed.

An endless tread belt which employs only two end wheels has a relatively flat arch. As a consequence the stresses within the arch on the pins and the jaws are quite high. Furthermore, with an increase in distance between the wheels and heavy loading these stresses become enormous.

When the pins and jaws of the treads become worn the endless track or truss-track, as it is called, soon assumes a reversed arch condition. When a truss track structure in this condition is towed over soft ground the wheels tend to "dig in" and the tractive load becomes enormous. Such a track frequently will nose entirely over under hard going and the trailing wheel will be thrown over in front of the leading wheel. Obviously under such conditions the expense of hauling a vehicle having worn tracks becomes prohibitive and the efficiency of the wagon or other structure which is supported by the track is very materially decreased.

When a track which has become worn until it presents a flat surface to the ground, passes over an obstacle, the first tendency of the flattened track structure on striking an obstacle, such as soft ground, a stone or the like, is to tend to "nose down" thus making the tractive effort considerably increased. It is to be noted that the track pushes against an obstacle such as a stone at a point well above the ground line of the structure to thus cause the nosing down action. When the track finally does crawl over the obstruction the rear wheel is caused to dig down still further and the front wheel lifts up or climbs out at a sharp angle. The result is that the tractive effort during this period is quite high.

In a track employing center wheels the unsupported portions of the arch are only one-half as long and thus the stresses on the pins and jaws of the track are very materially decreased. When such a track passes over an obstacle the arch of the track may be considered as a sector of the circle, the diameter of which is 5 to 10 times the diameter of the wheels. The front wheels will rise only slightly on first striking an obstacle and the rear wheels will roll downwardly on the arch of the track. Tilting of the track structure is gradual. The action is nothing more than the action which occurs when several small wheels roll on the inside of one large wheel and power is applied to the small wheels. The small wheels gradually climb on the arch presented by the track and the tractive effort necessary to raise the wheels over the obstacle is applied over a much greater space, thus minimizing the load impressed at any one time. The lift is more gradual over a longer distance of travel. The tendency of a track equipped with the center wheels is to nose up thus causing a sled-like action which minimizes the maximum tractive effort required to pull the track structure over an obstacle. Ordinarily the load of the vehicle is centered on the center wheels. If the resistance to turning of the track and wheels is increased, as for instance in pulling through soft ground, a slight rotation of the entire unit on the stub shaft occurs and the lever arm between the stub shaft and the ground becomes inclined and thus is greatly lengthened to cause the unit to ride over the soft ground without any material movement of rotation of the unit and without any material lifting or raising of the axis of the stub shaft. The greater the drag the greater the length of the lever arm from the stub shaft to the ground.

When wear takes place in the tracks, if no center wheel is employed the track sooner or later acquires a bad reverse arch. Such a track would require a tremendous tractive effort to pull it over soft ground. In a track structure having one or more center wheels constructed according to our invention and under the same conditions of wear the central reversed arch is broken up into two reversed arches and the tractive effort required would be only slightly greater than with a new track.

It is apparent therefore that with a track constructed according to our invention the track structure tends to "nose up", thus minimizing the maximum tractive effort required to pull a vehicle equipped with these tracks. Furthermore, the destructive effects of wear are greatly decreased, and the stresses in the track are much less than when no center wheel is employed. Thus heavier loads may be imposed on the track without the necessity of using larger cross-sectional areas of the track and of the pins. Inasmuch as the stresses are decreased by breaking the arch up into two parts wear is considerably decreased.

It is apparent that modifications of our invention may be made by those skilled in the art and such modifications may be made without departing from the spirit and scope of our invention as set forth in the appended claims.

We claim:

1. In an endless track structure, a stub shaft, a sleeve pivotally mounted on the said shaft, a rocking beam rigidly connected to the sleeve, a pair of supporting wheels rotatably mounted on each end of the rocking beam, and a third pair of wheels rotatably mounted on the sleeve, the wheels of each pair being positioned on opposite sides of said rocking beam.

2. In a vehicle including an endless track structure, a shaft for supporting the vehicle on the endless track structure, a rocker beam pivotally mounted on the shaft, a pair of track supporting wheels rotatably mounted on each end of the rocker beam, a self-supporting track adapted to rotate on the pairs of supporting wheels, said track being arched in its upper and lower stretches, and a third pair of wheels rotatably mounted on the shaft with one wheel mounted inside the rocker beam inside of the planes of the supporting wheels and with the other mounted outside the planes of the supporting wheels, the third pair of wheels being of sufficient diameter that the lower part of the wheels rolls on the inside of the lower part of the track whereby, even when the track becomes worn, the track is maintained in a double arch with the third pair of wheels as the apex, to cause the endless track structure to "nose up" on meeting an obstacle or "hard going" and to reduce drag by presenting a wide sloping face to the ground surface.

ROY E. CHOATE.
EMIL F. JIRSA.